United States Patent [19]
Fukuda

[11] Patent Number: 6,134,693
[45] Date of Patent: Oct. 17, 2000

[54] AUTOMATIC REPEAT REQUEST COMMUNICATION SYSTEM WITH IMPROVED THROUGHPUT BY USING RECEPTION CONFIRMATION TABLE

[75] Inventor: Kunio Fukuda, Tokyo, Japan

[73] Assignee: Sony Corporation, Tokyo, Japan

[21] Appl. No.: 09/014,589

[22] Filed: Jan. 28, 1998

[30] Foreign Application Priority Data

Feb. 6, 1997 [JP] Japan ................................. 9-023963

[51] Int. Cl.[7] .................................................. H04L 1/14
[52] U.S. Cl. ......................................................... 714/750
[58] Field of Search .............................. 714/748, 17, 749, 714/750, 751

[56] References Cited

U.S. PATENT DOCUMENTS

| | | | |
|---|---|---|---|
| 4,439,859 | 3/1984 | Donnan ................................... | 714/746 |
| 4,803,685 | 2/1989 | Oget .......................................... | 371/33 |
| 4,841,526 | 6/1989 | Wilson et al. ........................... | 714/708 |
| 5,165,091 | 11/1992 | Lape et al. .............................. | 370/216 |
| 5,210,751 | 5/1993 | Onoe et al. .............................. | 370/349 |
| 5,701,312 | 12/1997 | DeLuca et al. ........................... | 714/748 |
| 5,754,754 | 5/1998 | Dudley et al. .......................... | 714/748 |
| 5,889,790 | 3/1999 | Fukuda .................................... | 714/748 |

FOREIGN PATENT DOCUMENTS

| | | | |
|---|---|---|---|
| 0193091 | 9/1986 | European Pat. Off. .......... | H04L 1/16 |
| 0418866 | 3/1991 | European Pat. Off. .......... | H04L 1/16 |
| 0707394 | 4/1996 | European Pat. Off. .......... | H04L 1/18 |
| 0788254 | 8/1997 | European Pat. Off. .......... | H04L 1/18 |
| 0794630 | 9/1997 | European Pat. Off. .......... | H04L 1/00 |

*Primary Examiner*—Albert De Cady
*Assistant Examiner*—Jason Greene
*Attorney, Agent, or Firm*—Jay H. Maioli

[57] ABSTRACT

A request frame number indicative of a minimum frame number of data frames which have not been received and data frame reception confirmation information indicative of whether or not receptions of data frames from a frame number next to a minimum frame number in the data frames which have not been received to the last predetermined frame number have been confirmed are included in a feedback frame. Thus, there can be obtained a data communication method which makes it possible to reduce an unnecessary re-transmission to a reception side data communication apparatus carried out even when data frames transmitted from a transmission side data communication apparatus to the reception side data communication apparatus have been correctly received by the reception side data communication apparatus, and to hence improve a throughput of transmission of a data frame from the transmission side data communication apparatus to the reception side data communication apparatus.

27 Claims, 7 Drawing Sheets

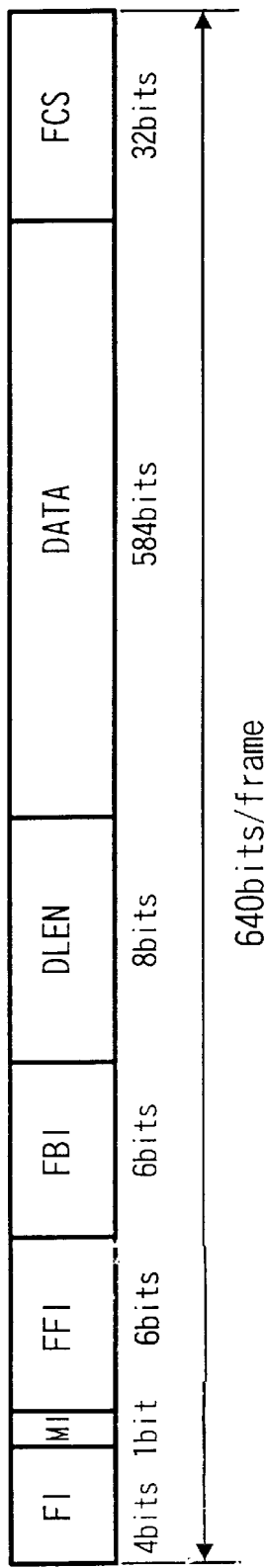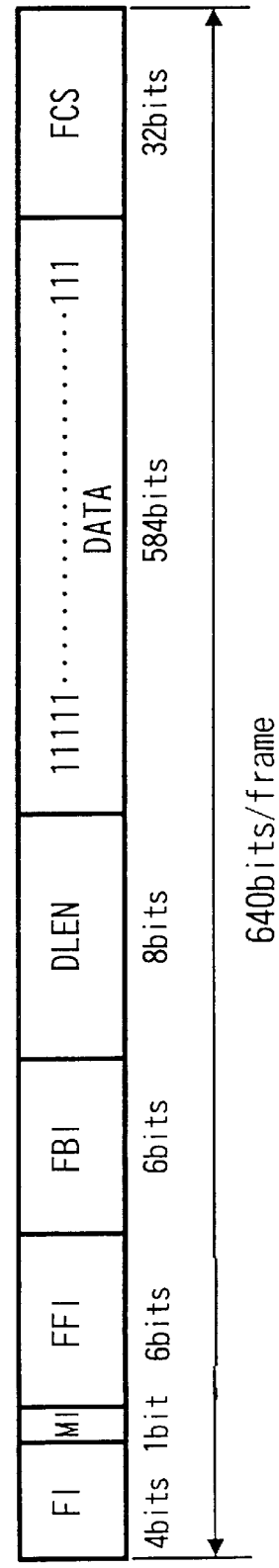
FIG. 1A
FIG. 1B

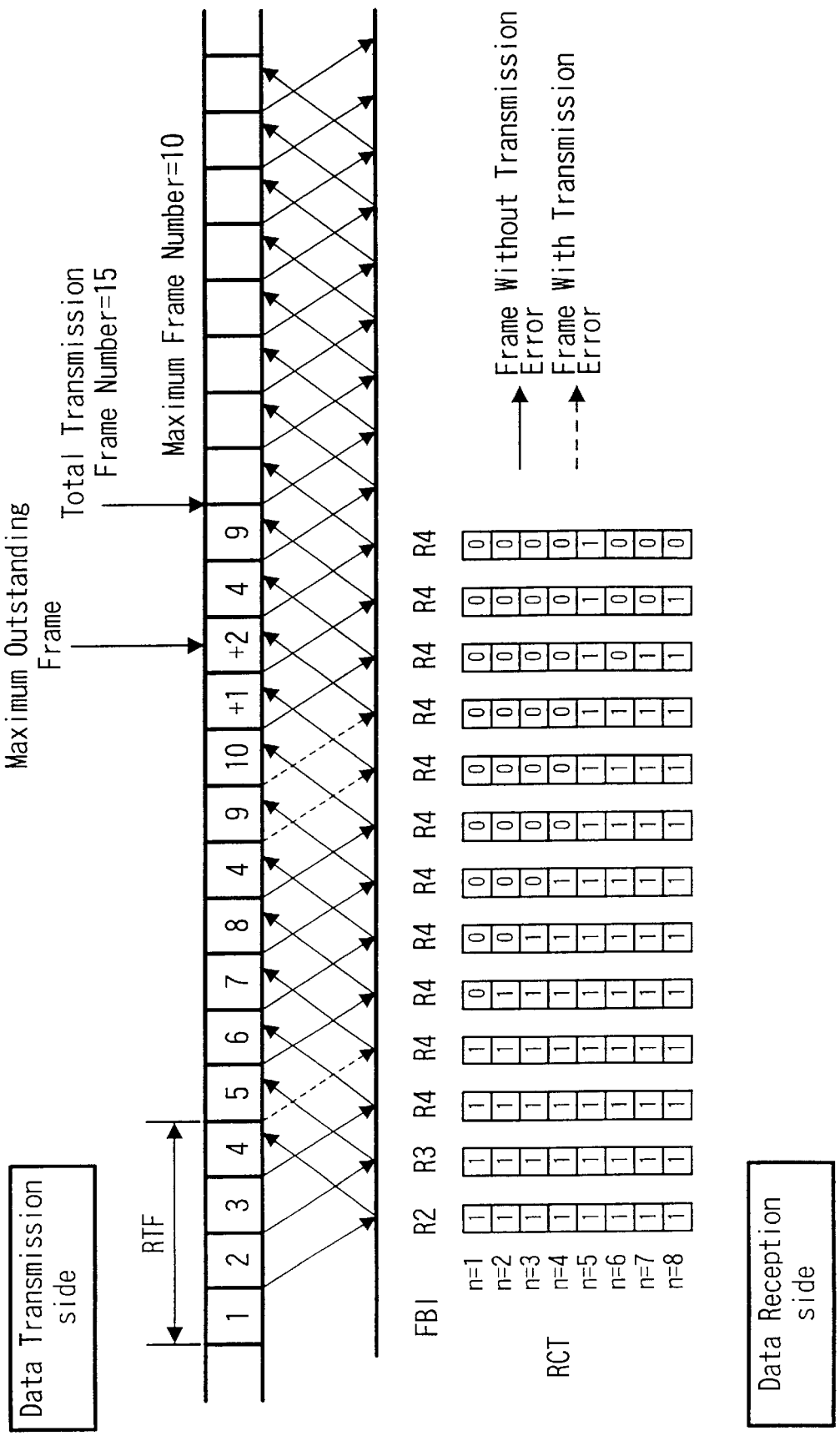

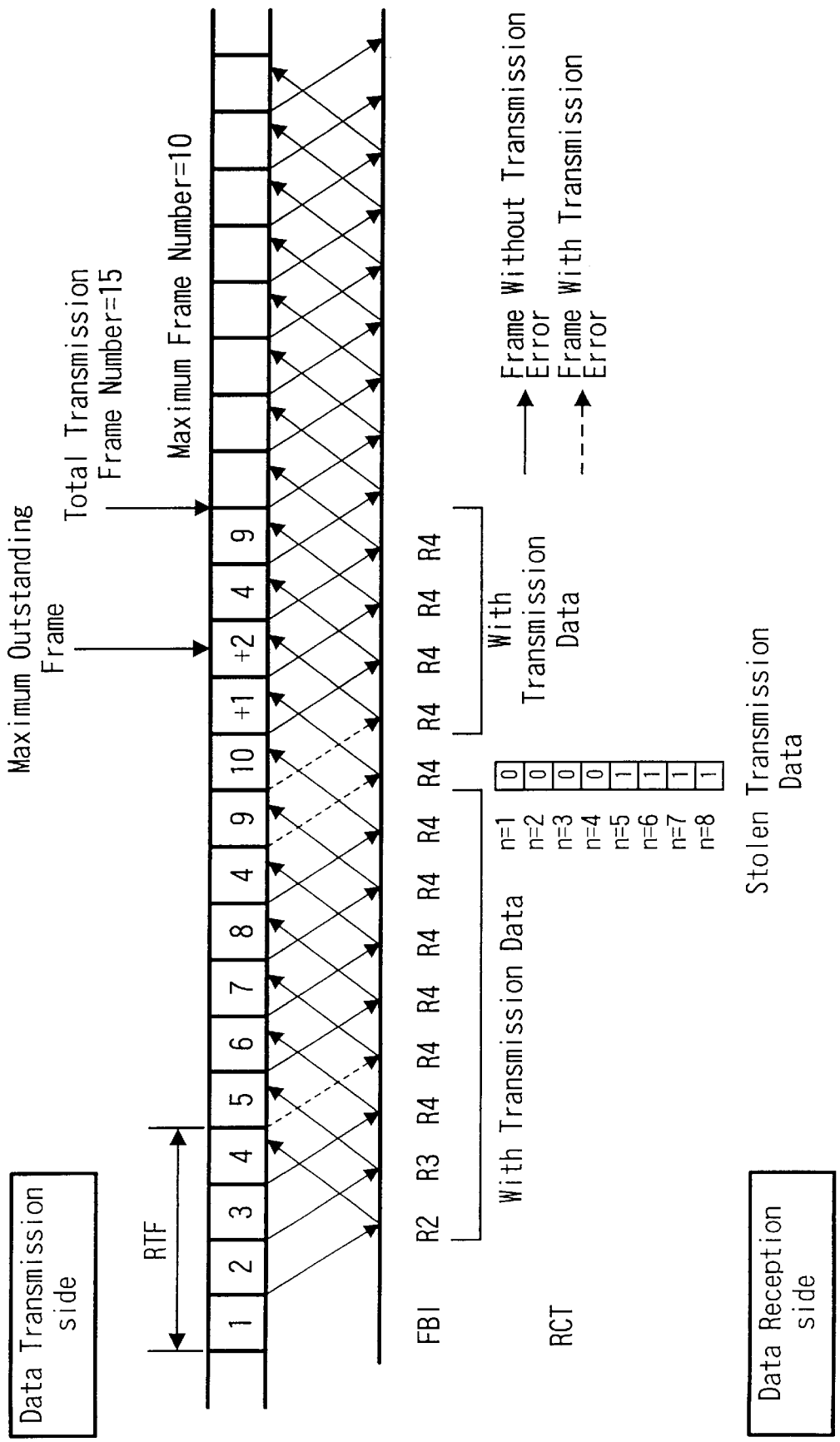

AUTOMATIC REPEAT REQUEST COMMUNICATION SYSTEM WITH IMPROVED THROUGHPUT BY USING RECEPTION CONFIRMATION TABLE

BACKGROUND

1. Field of the Invention

The present invention relates to a data communication method of an error control of an automatic repeat request system and a data communication apparatus therefor.

2. Background of the Invention

An error control method in a data communication system includes an error control method of an automatic repeat request (ARQ) system suitable for application to a mobile data communication system in which a burst error occurs relatively frequently. According to this error control method of an automatic repeat request system, if a data frame transmitted from a transmission side communication apparatus (data communication apparatus) to a reception side transmission apparatus (data communication apparatus) has an error, then the transmission side communication apparatus transmits the data frame to the reception side communication apparatus again based on a re-transmission request from the reception side communication apparatus to the transmission side communication apparatus.

Although there are various kinds of error control methods of automatic repeat request, an error control method of automatic repeat request system of a selective repeat (SR) system providing a high throughput will hereinafter be described by way of example.

An arrangement of an ARQ frame having the same format when it is a data frame and a feedback frame will be described with reference to FIGS. 1A and 1B. One ARQ frame is formed of, for example, 640 bits having successively disposed a 4-bit frame identifier FI, a 1-bit modulo identifier MI, a 6-bit transmission frame number area FFI, a 6-bit request frame number FBI, an 8-bit data length area (where a byte is used as a unit) DLEN, a 584-bit transmission data area DATA, and a 32-bit error detection code FCS. In this frame arrangement, each of the bit numbers of the areas is shown by way of example.

The frame identifier FI indicates a kind of a frame and is set to "0010", for example, in this example.

The transmission frame number FFI is allocated by using modulos of 63, by way of example. Identification of the modulos is indicated by the modulo identifier MI whose value is alternately "0" and "1". Specifically, when a data frame and a feedback frame are transmitted from a transmission-side data communication apparatus to a reception-side data communication apparatus in an ascending order of the transmission frame number FFI (or in a descending order thereof), in a state that the modulo identifier MI is MI=0, the transmission frame number FFI is changed in an order of 1, 2, 3, . . . , 62, 63. Then, in a state that the modulo identifier MI is MI=1, the transmission frame number FFI is changed in an order of 1, 2, 3, . . . , 62, 63. Then, in a state that the modulo identifier MI is MI=0, the transmission frame number FFI is changed in an order of 1, 2, 3, . . . 62, 63. Thereafter, this change of the transmission frame number is repeated.

The request frame number (transmission request frame number) FBI is a number of a frame which the transmission-side data communication apparatus requests the reception side data communication apparatus to transmit next, being a smallest frame number, corresponding to the frame number of the received frame number, (or a largest frame number in case of the transmission number FFI allocated in the ascending order) among data frames which have not been received.

The data length area DLEN indicates an amount of data included in the data area DATA and can indicate the data amount which ranges from 0 to 73 bytes, being 73 bytes in this example shown in FIGS. 1A and 1B.

The error detection code FCS is a 32-bit cyclic redundancy check (CRC) code which is a CRC 32 according to ITU (International Telecommunication Union)-T recommendation V. 42 (LAPM option). This CRC code effects a 608-bit area from the frame identifier FI to the data area DATA (=640 bits−32 bits).

Each of the data frame and the feedback frame respectively shown in FIGS. 1A and 1B does not include a synchronization word and so on used for establishing synchronization because they are used in a state that synchronization is established.

In the data frame shown in FIG. 1A, the data area DATA includes significant data, but the data area DATA of the feedback frame shown in FIG. 1B does not include significant data and hence includes non-significant data having all values of 1 (or may include other bit patterns such as all values of 0 or the like).

An ARQ transmission chart according to the SR system presented when a transmission frame shown in FIG. 1A has an error will be described with reference to FIG. 2. In FIG. 2, numerals in rectangular frames of the data transmission side (transmission side communication apparatus) depict frame numbers of transmission frames. It is assumed that there are ten transmission frames 1 to 10 and the frame numbers 1 and 10 respectively depict the first transmission frame number and the last transmission frame number (the maximum frame number). An arrow pointing toward the lower right depicts a transmission frame transmitted from the transmission side communication apparatus to the reception side communication apparatus. An arrow pointing toward an upper right depicts a feedback frame transmitted from the reception side communication apparatus to the transmission side communication apparatus. A solid-line arrow depicts a frame having no transmission error. A broken-line arrow depicts a frame (transmission frame) having a transmission error, i.e., a frame (transmission frame) which has not been received correctly. A request frame number of the feedback frame is depicted by a reference symbol R marked with a frame number. A reference symbol RTF depicts a round trip delay frame which indicates a multiple of a frame period required for the transmission side communication apparatus to, after transmitting a transmission frame (data frame) therefrom to the reception side communication apparatus, receive a feedback frame from the reception side communication apparatus indicating whether or not the reception side communication apparatus has received the transmission frame correctly. In this example shown in FIG. 2, the round trip delay frame RTF is 4.

Operations of the transmission side communication apparatus and the reception side data communication apparatus will be described with reference to FIG. 2.

[transmission side communication apparatus]

(1) Transmit data frames having the transmission numbers 1, 2 and 3 to the reception side communication apparatus successively (the modulo identifier MI is MI=0 and the following processes will be carried out under the same condition).

(2) Receive a feedback frame from the reception side communication apparatus as a frame responding to the data frame having the transmission number 1 while transmitting the data frame having the transmission frame number 4 to the reception side communication apparatus. Since the request frame number indicated by the feedback frame is 2, determine that the reception side communication apparatus has received the data frame having the transmission frame number 1 correctly.

(3) Receive a feedback frame from the reception side communication apparatus as a frame responding to the data frame having the transmission number 2 while transmitting the data frame having the transmission frame number 5 to the reception side communication apparatus. Since the request frame number indicated by the feedback frame is 3, determine that the reception side communication apparatus has received the data frame having the transmission frame number 2 correctly.

(4) Receive a feedback frame from the reception side communication apparatus as a frame responding to the data frame having the transmission number 3 while transmitting the data frame having the transmission frame number 6 to the reception side communication apparatus. Since the request frame number indicated by the feedback frame is 4, determine that the reception side communication apparatus has received the data frame having the transmission frame number 3 correctly.

(5) Receive a feedback frame from the reception side communication apparatus as a frame responding to the data frame having the transmission number 4 while transmitting the data frame having the transmission frame number 7 to the reception side communication apparatus. Since the request frame number indicated by the feedback frame is 4, determine that the reception side communication apparatus has not received the data frame having the transmission frame number 4 correctly.

(6) Transmit the data from having the transmission frame number 8 to the reception side communication apparatus and then re-transmit the data frame having the transmission fame number 4 to the reception side communication apparatus.

(7) Transmit data frames having the transmission numbers 9, 10, +1 and +2 to the reception side communication apparatus successively because the feedback frame as a frame responding to the re-transmitted data frame having the transmission frame number 4 will be received after a four-frame period. A symbol "+" depicts a transmission frame number allocated when the modulo identifier MI is MI=1.

(8) Receive a feedback frame from the reception side communication apparatus as a frame responding to the data frame having the transmission number 4 while transmitting the data frame having the transmission frame number +2 to the reception side communication apparatus. Since the request frame number indicated by the feedback frame reaches a maximum outstanding frame (=request frame number−2), transmit the data frame having the transmission frame number 4 and requested at present to the reception side communication apparatus without transmitting the data frame having the transmission frame number +3.

(9) Transmit successively the data frames having the transmission frame numbers 5, 6, 7 (these data frames are transmitted at the second time and hence their transmission frame numbers are indicated by open circles in FIG. 2) to the reception side communication apparatus because it is not clear whether the reception side communication apparatus has correctly received the data frames having the transmission frame numbers 4 and greater.

(10) Receive the feedback frame from the reception side communication apparatus as the frame responding to the data frame having the transmission number 4 while transmitting the data frame having the transmission frame number 7 to the reception side communication apparatus. Since the request frame number indicated by the feedback frame is 9, determine that the reception side communication apparatus has received the data frame having the transmission frame number 4 correctly.

[reception side communication apparatus]

The reception side communication apparatus constantly sets as the request frame number of the feedback frame a transmission frame number of a data frame which it requests the transmission side communication apparatus to transmit next time, and thereby transmits the feedback frame having the set transmission number to the transmission side communication apparatus.

(1) Since having received the data frames having the transmission frame numbers 1, 2 and 3 correctly, successively transmit feedback frames respectively including the request frame numbers 2, 3 and 4 to the transmission side communication apparatus.

(2) Since having not received the data frame having the transmission frame number 4 correctly, repeatedly transmit the feedback frame whose request frame number is 4 until correct reception of the data frame having the transmission frame number 4.

(3) If receiving the data frame having the transmission frame number 4 correctly, repeatedly transmit a feedback frame having a request frame number 9 which is a minimum number among frame numbers of frames that have not been received, until receiving the data frame having the transmission frame number 9 correctly.

In the ARQ error control method of SR system of the example shown in FIG. 2, when the transmission side communication apparatus transmits the data frames having the transmission frame numbers 1 to 10 to the reception side communication apparatus, the number of the transmission frames practically transmitted is 18.

In the example shown in FIG. 2, assuming that the frame number of the data frames to be transmitted from the transmission side communication apparatus to the reception side communication apparatus is N0 and the frame number of the data frames practically transmitted is N1, then a throughput S of transmission of the data frames from the transmission side communication apparatus to the reception side communication apparatus according to this control method is expressed by the following equation (1):

$$S=N0/N1=12/18=0.67 \qquad (1)$$

In the example shown in FIG. 2, the data frame having the transmission frame number 4 is not correctly received twice by the reception side communication apparatus and hence transmitted three times. The data frame having the transmission frame number 9 is not correctly received once by the reception side communication apparatus and hence transmitted twice. However, study of FIG. 2 reveals that, although having been received correctly by the reception side communication apparatus, the data frames having the transmission frame numbers 5, 6, 7 are unnecessarily re-transmitted since the request frame numbers of the feedback frames have been 4 (due to a round trip delay) until the transmission of the data frame having the transmission frame number 7. This is a cause of lowering the throughput S of the transmission of the data frames from the transmission side communication apparatus to the reception side communication apparatus according to this control method. The throughput S is lowered as the round trip delay amount is increased.

SUMMARY OF THE INVENTION

In view of such aspects, it is an object of the present invention to propose a data communication method which, in a data communication method of transmitting data frames from a first predetermined frame number to a last predetermined frame number from a transmission side data communication apparatus to a reception side data communication apparatus in an ascending order (or a descending order), transmitting a feedback frame including at least a request frame number formed of a minimum (or maximum) frame number among those of data frames, which have not been received, from the reception side data communication apparatus to the transmission side data communication apparatus in response to the frame numbers of the received data frames, and transmitting, in response to the request frame number in the received feedback frame, a data frame having a frame number, which the reception side data communication apparatus has not confirmed, from the reception side communication apparatus to the transmission side data communication apparatus, makes it possible to, without changing a format of the feedback frame, reduce an unnecessary re-transmission to a reception side data communication apparatus carried out even when data frames transmitted from a transmission side data communication apparatus to the reception side data communication apparatus have been correctly received by said reception side data communication apparatus, and to hence improve a throughput of transmission of a data frame from the transmission side data communication apparatus to the reception side data communication apparatus.

In view of such aspects, it is an object of the present invention to propose a data communication apparatus which, in a data communication apparatus employed in a data communication method of transmitting data frames from a first predetermined frame number to a last predetermined frame number from a transmission side data communication apparatus to a reception side data communication apparatus in an ascending order (or a descending order), transmitting a feedback frame including at least a request frame number formed of a minimum (or maximum) frame number among those of data frames, which have not been received, from the reception side data communication apparatus to the transmission side data communication apparatus in response to the frame numbers of the received data frames, and transmitting, in response to the request frame number in the received feedback frame, a data frame having a frame number, that the reception side data communication apparatus has not confirmed, from the reception side communication apparatus to the transmission side data communication apparatus, makes it possible to, without changing a format of the feedback frame, reduce an unnecessary re-transmission to a reception side data communication apparatus carried out even when data frames transmitted from a transmission side data communication apparatus to the reception side data communication apparatus have been correctly received by said reception side data communication apparatus, and to hence improve a throughput of transmission of a data frame from the transmission side data communication apparatus to the reception side data communication apparatus.

According to an aspect of the present invention, in a data communication method of transmitting data frames from a first predetermined frame number to a last predetermined frame number from a transmission side data communication apparatus to a reception side data communication apparatus in an ascending order (or a descending order), transmitting a feedback frame including at least a request frame number formed of a minimum (or maximum) frame number among those of data frames, which have not been received, from the reception side data communication apparatus to the transmission side data communication apparatus in response to the frame numbers of the received data frames, and transmitting, in response to the request frame number in the received feedback frame, a data frame having a frame number, which the reception side data communication apparatus has not confirmed, from the reception side communication apparatus to the transmission side data communication apparatus, data frame reception confirmation information indicative of whether or not receptions of data frames from a frame number next to a minimum (or maximum) frame number in the data frames which have not been received to the last predetermined frame number have been confirmed is included in the feedback frame.

According to the present invention, since the feedback frame includes the data frame reception confirmation information indicative of whether or not the receptions of the data frames from a frame number next to a minimum (or maximum) frame number among those of the data frames that have not been received to a last predetermined frame number have been confirmed, it becomes possible to reduce an unnecessary retransmission to a reception side data communication apparatus carried out even when data frames transmitted from a transmission side data communication apparatus to the reception side data communication apparatus have been correctly received by said reception side data communication apparatus, and to hence improve a throughput of transmission of a data frame from the transmission side data communication apparatus to the reception side data communication apparatus.

BRIEF DESCRIPTION OF THE DRAWINGS

FIGS. 1A and 1B are diagrams respectively showing formats of a data frame and a feedback frame;

FIG. 4 is a diagram showing a transmission chart of an SR-ARQ system according to the first embodiment of the present invention;

FIG. 6 is a diagram showing a transmission chart of an SR-ARQ system according to the second embodiment of the present invention.

DESCRIPTION OF THE PREFERRED EMBODIMENTS

Figure 2:
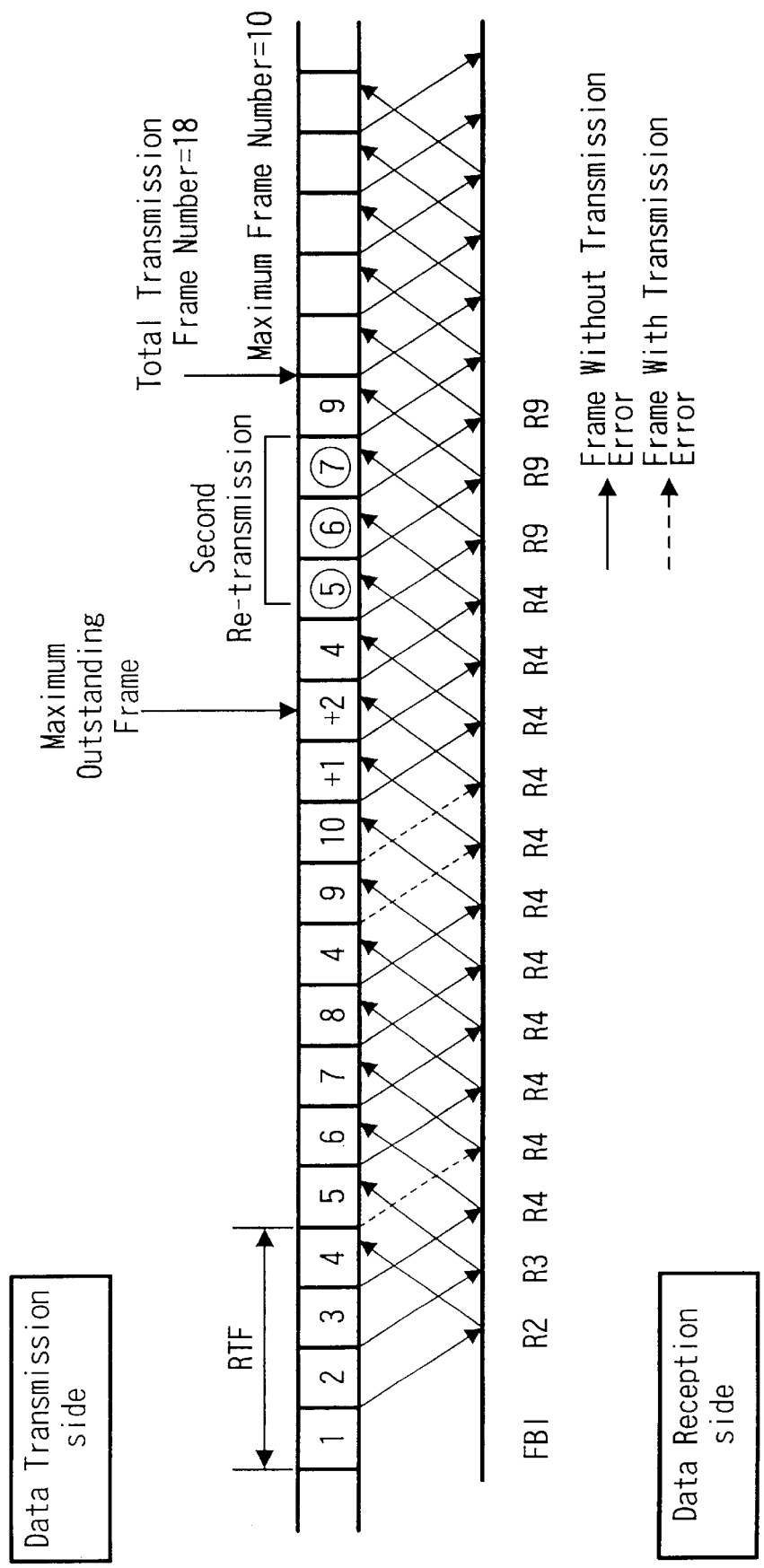
FIG. 2 is a diagram showing a transmission chart of an SR-ARQ system having formats shown in FIGS. 1A and 1B.

A data communication method according to a first embodiment of the present invention will hereinafter be described with reference to the accompanying drawings. The data communication method of the first embodiment employs an error control method of an automatic repeat request (ARQ) system of a high-throughput selective repeat (SR) system similarly to the example in FIG. 2. An arrangement of an ARQ frame having the same format when it is a data frame and a feedback frame will be described with reference to FIGS. 3A and 3B.

One ARQ frame is formed of, for example, 640 bits and has a 4-bit frame identifier FI, a 1-bit modulo identifier MI, a 6-bit transmission frame number FFI, a 6-bit request frame number FBI, a 8-bit data length (where a byte is used as a unit) DLEN, a 584-bit transmission data area DATA, and a 32-bit error detection code FCS. In this frame arrangement, each of the bit numbers of the areas is shown by way of example.

The frame identifier FI indicates a kind of a frame and is set to "1111", for example, in this example in order to make it different from "0010" used as the frame identifier FI in the arrangement shown in FIGS. 1A and 1B.

The transmission frame number FFI is allocated by using modulos of 63, by way of example. Identification of the modulos is indicated by the modulo identifier MI whose value is alternately "0" and "1". Specifically, when a data frame and a feedback frame are transmitted from a transmission-side data communication apparatus to a reception-side data communication apparatus in an ascending order of the transmission frame number FFI (or in a descending order thereof), in a state that the modulo identifier MI is MI=0, the transmission frame number FFI is changed in an order of 1, 2, 3, . . . , 62, 63. Then, in a state that the modulo identifier MI is MI=1, the transmission frame number FFI is changed in an order of 1, 2, 3, . . . 62, 63. Then, in a state that the modulo identifier MI is MI=0, the transmission frame number FFI is changed in an order of 1, 2, 3, . . . , 62, 63. Thereafter, this change of the transmission frame number is repeated.

The request frame number (transmission request frame number) FBI is a number of a frame which the transmission-side data communication apparatus requests the reception side data communication apparatus to transmit next, being a smallest frame number, corresponding to the frame number of the received frame number, (or a largest frame number in case of the transmission number FFI allocated in the descending order) among data frames which have not been received.

The data length area DLEN indicates an amount of data included in the data area DATA and can indicate the data amount which ranges from 0 to 73 bytes, being 73 bytes in this example shown in FIGS. 1A and 1B.

The error detection code FCS is a 32-bit cyclic redundancy check (CRC) code which is a CRC 32 according to ITU (International Telecommunication Union)-T recommendation V. 42 (LAPM option). This CRC code effects a 608-bit area from the frame identifier FI to the data area DATA (=640 bits–32 bits).

Each of the data frame and the feedback frame respectively shown in FIGS. 1A and 1B does not include a synchronization word and so on used for establishing synchronization because they are used in a state that synchronization is established.

In the data frame shown in FIG. 1A, the data area DATA includes a significant data, but the data area DATA of the feedback frame shown in FIG. 1B does not include a significant data and hence includes a non-significant data having all values of 1 (or may include that having other bit patterns such as all values of 0 or the like).

Accordingly, the reception side communication apparatus transmits to the transmission side communication apparatus a feedback frame having in a first 61-bit area in the data area DATA a reception confirmation table RCT of 1-bit informations Cn (n=1 to 61) respectively indicating whether or not receptions of the data frames from the frame number next to the minimum frame number (or the maximum frame number in case of the transmission number FFI allocated in the ascending order) to a last predetermined frame number (i.e., the maximum outstanding frame number) (the minimum outstanding frame number in case of the transmission number FFI allocated in the ascending order), i.e., the data frames of the frame numbers obtained by adding a first frame number (2 in this case) of data frames, which have not been confirmed by the reception side communication apparatus, of "the maximum frame number (=63)"–2 with the numbers of 1 to 61 have been confirmed. In this case, Cn=0 indicates that the reception of the data frame has been confirmed, and Cn=1 indicates that the reception of the data frame has not been confirmed yet.

The reception confirmation table RCT can be provided in a dedicated area in a frame other than the data area DATA.

An ARQ transmission chart according to the SR system presented when a transmission frame shown in FIG. 3A has an error will be described with reference to FIG. 4. In FIG. 4, numerals in rectangular frames of the data transmission side (transmission side communication apparatus) depict frame numbers of transmission frames. For simplification of the description, it is assumed that there are ten transmission frames 1 to 10 and the frame numbers 1 and 10 respectively depict the first transmission frame number and the last transmission frame number (the maximum frame number). An arrow pointing toward the lower right depicts a transmission frame transmitted from the transmission side communication apparatus to the reception side communication apparatus. An arrow pointing toward an upper right depicts a feedback frame transmitted from the reception side communication apparatus to the transmission side communication apparatus. A solid-line arrow depicts a frame having no transmission error. A broken-line arrow depicts a frame (transmission frame) having a transmission error, i.e., a frame (transmission frame) which has not been received correctly. A request frame number of the feedback frame is depicted by a reference symbol R marked with a frame number. A reference symbol RTF depicts a round trip delay frame which indicates a multiple of a frame period required for the transmission side communication apparatus to, after transmitting a transmission frame (data frame) therefrom to the reception side communication apparatus, receive a feedback frame from the reception side communication apparatus indicating whether or not the reception side communication apparatus has received the transmission frame correctly. In this example shown in FIG. 2, the round trip delay frame RTF is 4.

The reception side communication apparatus always sets the transmission frame number of the data frame which is desired to be transmitted next, as a request frame number, and transmits to the transmission side communication apparatus a feedback frame having in a first 8-bit area in the data area DATA a reception confirmation table RCT of 1-bit informations Cn (n=1 to 8) respectively indicating whether or not receptions of the data frames from the frame number next to the minimum frame number (or the maximum frame number in case of the transmission number FFI allocated in the ascending order) to a last predetermined frame number (i.e., the maximum outstanding frame number) (the minimum outstanding frame number in case of the transmission number FFI allocated in the ascending order), i.e., the data frames of the frame numbers obtained by adding a first frame number (2 in this case) of data frames, which have not been confirmed by the reception side communication apparatus, of "the maximum frame number (=10)"–2 with the numbers of 1 to 8 have been confirmed. In this case, Cn=0 indicates that the reception of the data frame has been confirmed, and Cn=1 indicates that the reception of the data frame has not been confirmed yet.

[transmission side communication apparatus]

(1) Transmit data frames having the transmission numbers 1, 2 and 3 to the reception side communication apparatus successively.

(2) Receive a feedback frame from the reception side communication apparatus as a frame responding to the data frame having the transmission number 1 while transmitting the data frame having the transmission frame number 4 to the reception side communication apparatus. Since the request frame number indicated by the feedback frame is 2, determine that the reception side communication apparatus has received the data frame having the transmission frame number 1 correctly.

(3) Receive a feedback frame from the reception side communication apparatus as a frame responding to the data frame having the transmission number 2 while transmitting the data frame having the transmission frame number 5 to the reception side communication apparatus. Since the request frame number indicated by the feedback frame is 3, determine that the reception side communication apparatus has received the data frame having the transmission frame number 2 correctly. A reception confirmation table of the feedback frame has informations $C_1$ to $C_8=1$.

(4) Receive a feedback frame from the reception side communication apparatus as a frame responding to the data frame having the transmission number 3 while transmitting the data frame having the transmission frame number 6 to the reception side communication apparatus. Since the request frame number indicated by the feedback frame is 4, determine that the reception side communication apparatus has received the data frame having the transmission frame number 3 correctly. A reception confirmation table of the feedback frame has informations $C_1$ to $C_8=1$.

(5) Receive a feedback frame from the reception side communication apparatus as a frame responding to the data frame having the transmission number 4 while transmitting the data frame having the transmission frame number 7 to the reception side communication apparatus. Since the request frame number indicated by the feedback frame is 4, determine that the reception side communication apparatus has not received the data frame having the transmission frame number 4 correctly. A reception confirmation table of the feedback frame has informations $C_1$ to $C_8=1$.

(6) Receive a feedback frame from the reception side communication apparatus as a frame responding to the data frame having the transmission number 5 while transmitting the data frame having the transmission frame number 8 to the reception side communication apparatus. Since the request frame number indicated by the feedback frame is 4, determine that the reception side communication apparatus has not received the data frame having the transmission frame number 4 correctly. A reception confirmation table of the feedback frame has informations $C_1=0$ and $C_2$ to $C_8=1$. This reveals that the reception of the data frame having the transmission frame number 3 has already been confirmed.

(7) Receive a feedback frame from the reception side communication apparatus as a frame responding to the data frame having the transmission number 6 while transmitting the data frame having the transmission frame number 4 to the reception side communication apparatus again. Since the request frame number indicated by the feedback frame is 4, determine that the reception side communication apparatus has not received the data frame having the transmission frame number 4 correctly. A reception confirmation table of the feedback frame has informations $C_1$ and $C_2=0$ and $C_3$ to $C_8=1$. This reveals that the receptions of the data frames having the transmission frame numbers 3 and 4 have already been confirmed.

(8) Transmit data frames having the transmission numbers 9, 10, +1 and +2 to the reception side communication apparatus successively because the feedback frame as a frame responding to the re-transmitted data frame having the transmission frame number 4 will be received after a four-frame period. A symbol "+" depicts a transmission frame number allocated when the modulo identifier MI is MI=1.

Receive feedback frames from the reception side communication apparatus as frames responding to the data frames having the transmission numbers 7, 8, 4, 9 while transmitting the data frames having the transmission frame numbers 9, 10, +1 and +2 to the reception side communication apparatus. Since the request frame numbers indicated by the feedback frames responding to the data frames having the transmission frame numbers 7, 8, 4, 9 are all 4, determine that the reception side communication apparatus has not received the data frame having the transmission frame number 4 correctly.

A reception confirmation table of the feedback frame responding the data frame having the transmission number 7 has informations $C_1$ to $C_3=0$ and $C_4$ to $C_8=1$. This reveals that the receptions of the data frames having the transmission frame numbers 3, 4 and 5 have already been confirmed. Reception confirmation tables of the feedback frames responding to the data frames having the transmission numbers 8 and 4 have informations $C_1$ to $C_4=0$ and $C_5$ to $C_8=1$. This reveals that the receptions of the data frames having the transmission frame numbers 3, 4, 5 and 6 have already been confirmed.

(9) Receive a feedback frame from the reception side communication apparatus as a frame responding to the data frame having the transmission number 4 while transmitting the data frame having the transmission frame number +2 to the reception side communication apparatus. Since the request frame number indicated by the feedback frame reaches a maximum outstanding frame (=request frame number−2), transmit the data frame having the transmission frame number 4 and requested at present to the reception side communication apparatus without transmitting the data frame having the transmission frame number +3. Receive a feedback frame from the reception side communication apparatus as a frame responding to the data frame having the transmission number 10 while transmitting the data frame having the transmission frame number 4 to the reception side communication apparatus again. Since the request frame number indicated by the feedback frame is 4, determine that the reception side communication apparatus has not received the data frame having the transmission frame number 4 correctly. A reception confirmation table of the feedback frame has informations $C_1$ to $C_4$ and $C_6=0$ and $C_5$, $C_7$ and $C_8=1$. This reveals that the receptions of the data frames having the transmission frame numbers 3 to 6 and 8 have already been confirmed.

(10) Transmit the data frame having the transmission frame number 9 to the reception side communication apparatus again.

[reception side communication apparatus]

The reception side communication apparatus always sets the transmission frame number of the data frame which is desired to be transmitted next, as a request frame number, and transmits to the transmission side communication apparatus a feedback frame having in a first 8-bit area in the data area DATA a reception confirmation table RCT of 1-bit informations Cn (n=1 to 8) respectively indicating whether or not receptions of the data frames from the frame number next to the minimum frame number (or the maximum frame number in case of the transmission number FFI allocated in the ascending order) to a last predetermined frame number (i.e., the maximum frame number), i.e., the data frames of the frame numbers obtained by adding a first frame number (2 in this case) of data frames, which have not been confirmed by the reception side communication apparatus, of "the maximum frame number (=10)"−2 with the numbers of 1 to 8 have been confirmed. In this case, Cn=0 indicates that the reception of the data frame has been confirmed, and Cn=1 indicates that the reception of the data frame has not been confirmed yet.

(1) Since having received the data frames having the transmission frame numbers 1, 2 and 3 correctly, successively transmit to the transmission side communication apparatus feedback frames respectively having the request frame numbers 2, 3 and 4 and having the reception confirmation tables of $C_1$ to $C_8$=1 because receptions of the data frames having the transmission frame numbers 3 to 10, 4 to 10 and 4 to 10 respectively next to the request frame numbers 2, 3, and 4.

(2) Since having not received the data frame having the transmission frame number 4 correctly, repeatedly transmit to the transmission side communication apparatus the feedback frame having the request frame number 4 and having the reception confirmation tables of $C_1$ to $C_8$=1 because receptions of the data frames having the transmission frame numbers 5 to 10 next to the request frame number 4, until correct reception of the data frame having the transmission frame number 4.

(3) Receive the data frames having the transmission frame numbers 5, 6, 7 and 8 from the transmission side data communication apparatus. Then, successively transmit to the transmission side communication apparatus feedback frames respectively having the request frame number 4 and having the reception confirmation table of $C_1$=0 and $C_2$ to $C_8$=1, the reception confirmation table of $C_1$ and $C_2$=0 and $C_3$ to $C_8$=1, the reception confirmation table of $C_1$ to $C_3$=0 and $C_4$ to $C_8$=1, and the reception confirmation table of $C_1$ to $C_4$=0 and $C_5$ to $C_8$=1.

(4) Since having not received each of the data frames having the transmission frame numbers 4 and 9 correctly, successively transmit to the transmission side communication apparatus the feedback frames respectively having the request frame number 4 and having the reception confirmation table of $C_1$ to $C_4$=0 and $C_5$ to $C_8$=1.

(5) Since having transmitted the data frames having the transmission frame numbers 10, +1, +2, successively transmit to the transmission side communication apparatus the feedback frames respectively having the request frame number 4 and having the reception confirmation table of $C_1$ to $C_4$ and $C_6$=0 and $C_5$, $C_7$, and $C_8$=1, the reception confirmation table of $C_1$ to $C_4$, $C_6$ and $C_7$=0 and $C_5$ and $C_8$=1, and the reception confirmation table of $C_1$ to $C_4$ and $C_6$ to $C_8$=0 and $C_5$=1.

As described above, since the reception confirmation frame information is transmitted from the reception side communication apparatus to the transmission side communication apparatus with being included in the feedback frame, if the data frames already transmitted from the transmission side communication apparatus to the reception side communication apparatus fails to be received correctly many times, then the transmission side communication apparatus can recognize an extent of the data frames, among the data frames from the data frame next to the data frame the reception side communication apparatus has not received correctly to the last data frame, which the reception side communication apparatus has already confirmed with respect to reception. Therefore, the data frames which the reception side communication apparatus has already confirmed with respect to reception are prevented from being unnecessarily transmitted again from the transmission side communication apparatus to the reception side communication apparatus as shown in the example shown in FIG. 2.

Figure 3A:
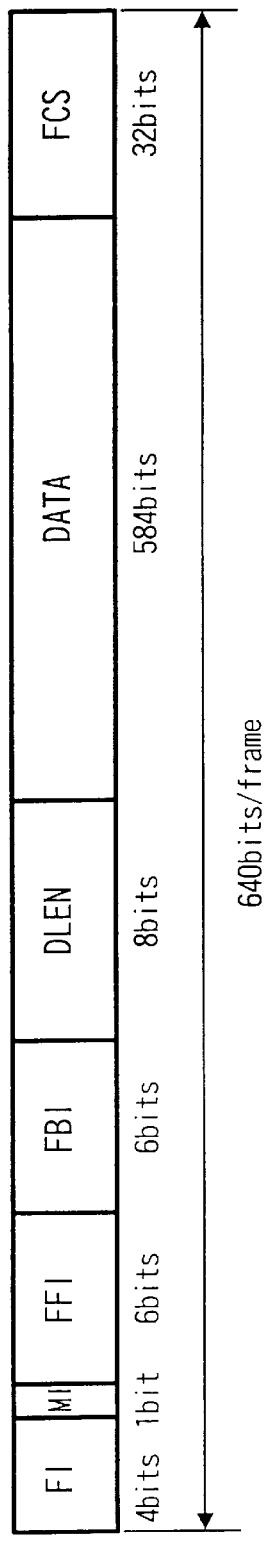
FIGS. 3A and 3B are diagrams respectively showing formats of a data frame and a feedback frame according to a first embodiment of the present invention.

In the embodiment shown in FIG. 2, assuming that the frame number of the data frames to be transmitted from the transmission side communication apparatus to the reception side communication apparatus is N0 and the frame number of the data frames practically transmitted for transmission of the data frames of N0 is N1, then a throughput S of transmission of the data frames from the transmission side communication apparatus to the reception side communication apparatus according to the control method of this embodiment is expressed by the following equation (2):

$$S=N0/N1=12/15=0.8 \qquad (2)$$

Accordingly, the throughput S (=0.8) in the embodiment shown in FIG. 4 is improved by 12% as compared with the throughput S obtained in the example shown in FIG. 2.

Figure 3B:
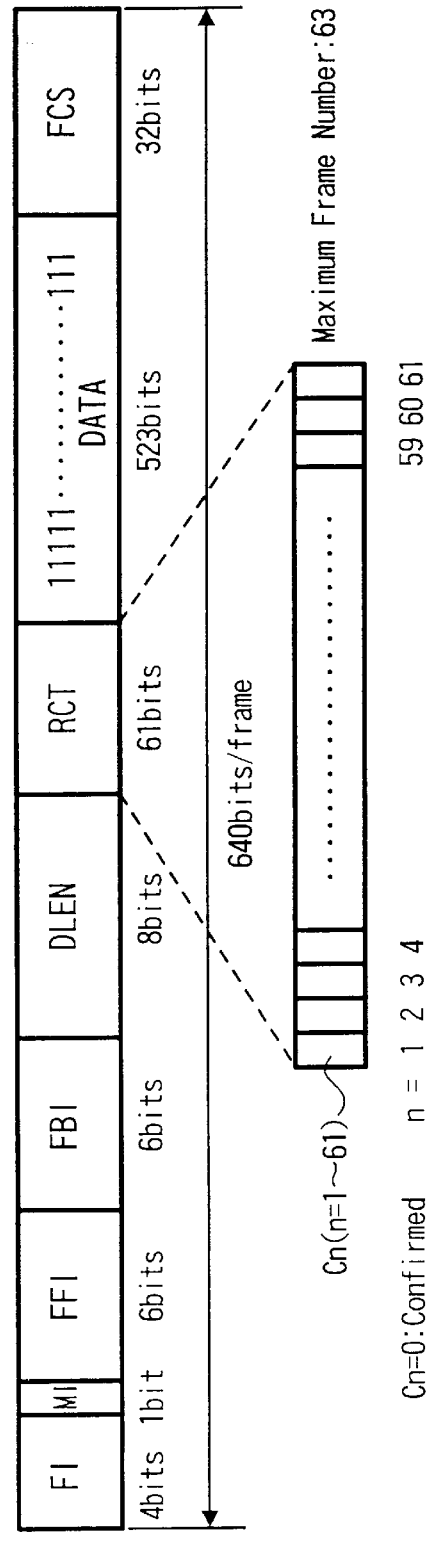
Figure 5A:
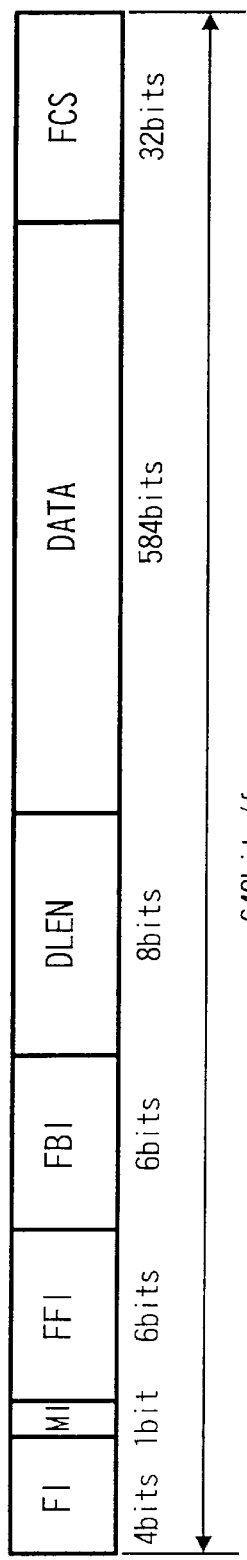
FIGS. 5A and 5B are diagrams respectively showing formats of a data frame and a feedback frame according to a second embodiment of the present invention.
Figure 5B:
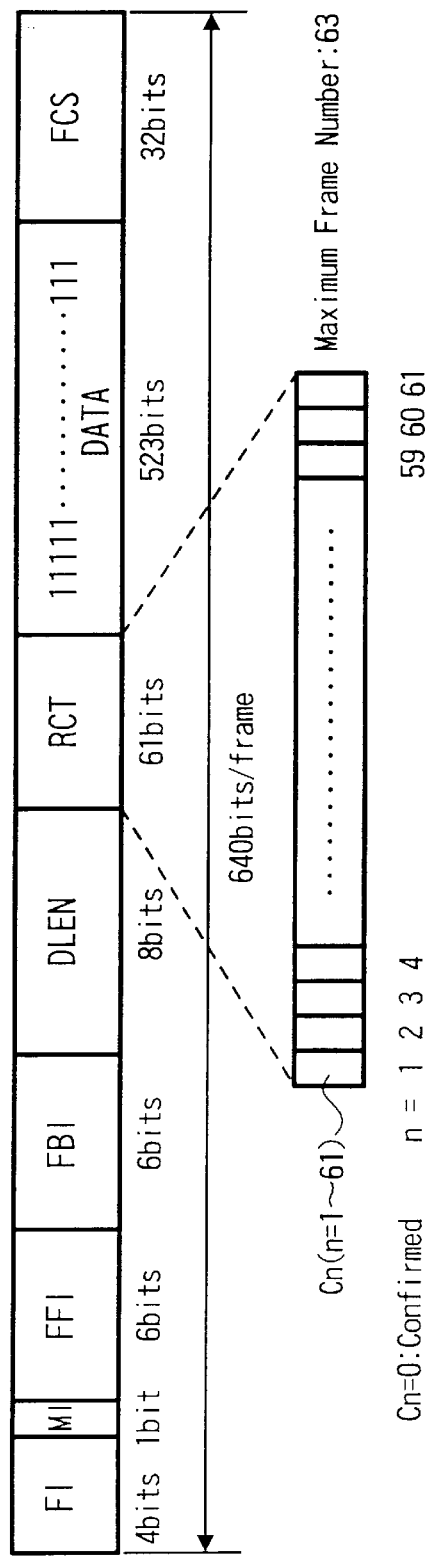

A data communication method according to a second embodiment of the present invention will be described with reference to FIGS. 5A, 5B and 6. The data communication method according to the second embodiment of a full duplex communication system. The data frame used therein is similar to that shown in FIG. 3A and hence needs not be described in detail. As shown in FIG. 5A, the feedback frame has the same format as that of the data frame shown in FIG. 3A but is different therefrom in that the data area DATA includes a significant data. When the reception confirmation table RCT similar to that shown in FIG. 5B is desired to be included in the feedback frame, a processing for including data in the data area DATA of the feedback frame is temporarily stopped. Specifically, the reception confirmation table RCT similar to that shown in FIG. 3B is included in a first 611-bit area of the data area DATA, and data all having a value of 1 are included in other 523-bit area thereof.

An ARQ transmission chart according to the SR system shown in FIGS. 5A and 5B presented when a transmission frame similar to that shown in FIG. 3A has an error will be described with reference to FIG. 6. In FIG. 6, numerals in rectangular frames of the data transmission side (transmission side communication apparatus) depict frame numbers of transmission frames.

An operation of the transmission side communication apparatus for the case shown in FIG. 6 is similar to that in the case shown in FIG. 4. When the reception side communication apparatus receives the data frames having the transmission frame numbers 1 to 8 (it is assumed that it has not received the data frame having the transmission frame number 4 correctly in this case), the feedback frames responding to the respective received data frames has the request frame numbers similar to those used in the example shown in FIG. 4, while each of their data areas DATA includes a significant data and does not include a reception confirmation table RCT.

Since the reception side communication has not received the data frame having the transmission frame number 4 twice, when the reception side communication has not received the data frame having the transmission frame number 4 at the second time, the reception side communication apparatus temporarily stops (steals) a processing for including the data in the data area DATA and transmits to the transmission side communication apparatus a feedback frame having the request frame number 4, no data in its data area DATA, and the reception confirmation table RCT of $C_1$ to $C_4=0$ and $C_5$ to $C_8=1$.

Thereafter, when the reception side communication apparatus receives the data frames having the transmission frame numbers 9, 10, +1, +2 (it is assumed that it has not received the data frame having the transmission frame number 9 correctly), the request frame numbers of the feedback frames responding to the received data frames are set similarly to the case shown in FIG. 4, while each of their data areas DATA includes a significant data and no reception confirmation table RCT.

As described above, even in the full duplex communication system, since the reception side communication apparatus temporarily stops (steals) the processing for including the data in the feedback frame, it is possible to transmit to the transmission side communication apparatus the feedback frame including the request frame number FBI and the data frame reception confirmation information.

Figure 7:
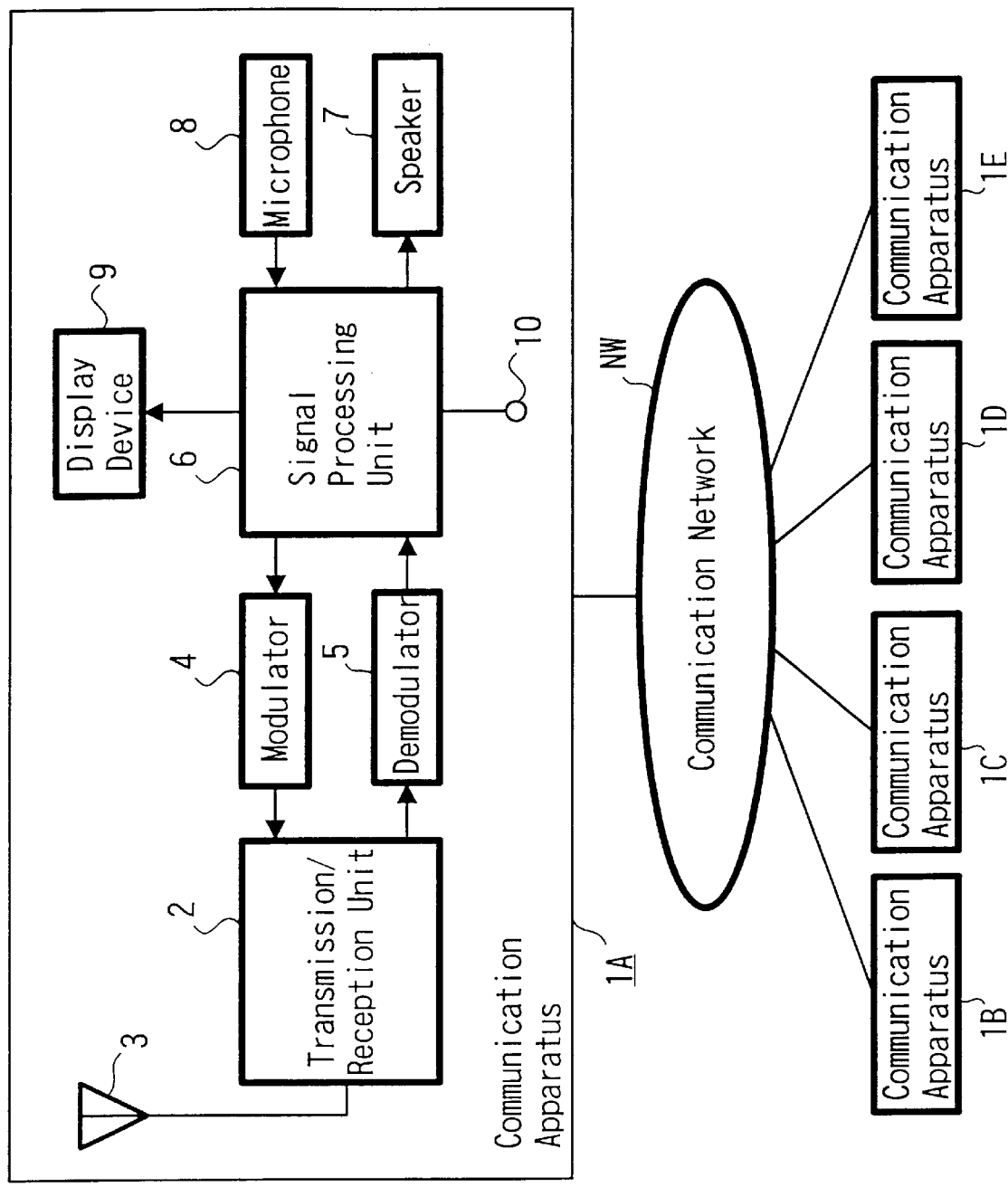
FIG. 7 is a diagram showing a communication system to which the embodiments of the present invention can be applied.

A communication system including a data communication apparatus to which the present invention can be applied will be described with reference to FIG. 7. A data communication apparatus 1A is a telephone in a personal handy-phone system (PHS), for example, which can communicate with various data communication apparatus 1B, 1C, 1D, 1E, by wireless or through wireless communication network NW. The data communication apparatus 1B, 1C, 1D, 1E, . . . are a PHS telephone similar to the data communication apparatus 1A, a wireless telephone such as a cellular system telephone or the like, a wire telephone, a relay station, a base station, or the like.

The data communication apparatus 1A has a transmission/reception unit 2, a transmission/reception antenna 3, a modulator 4 and a demodulator 5 connected to the transmission/reception unit 2, a signal processing unit 6 connected to the modulator 4 and the demodulator 5, a speaker 7 connected to the signal processing unit 6, a microphone 8 connected to the signal processing unit 6, a display device 9 connected to the signal processing unit 6 for displaying a text, a numeric, a symbol, a figure, an image and so on (formed of a liquid-crystal display or the like). An input/output terminal 10 for an external digital data is derived from the signal processing unit 6. The above-mentioned data frame transmitted from the transmission side communication apparatus to the reception side communication apparatus and the feedback frame transmitted from the above-mentioned reception side communication apparatus to the transmission side communication apparatus are respectively generated by the transmission side communication apparatus and the reception side communication apparatus, which are a certain data communication apparatus of the data communication apparatus 1B, 1C, 1D, 1E, . . . , for communicating with the other data communication apparatus thereof.

According to a first aspect of the present invention, a data communication method is one of transmitting data frames from a first predetermined frame number to a last predetermined frame number from a transmission side data communication apparatus to a reception side data communication apparatus in an ascending order (or a descending order), transmitting a feedback frame including at least a request frame number formed of a minimum (or maximum) frame number among those data frames, which have not been received, from the reception side data communication apparatus to the transmission side data communication apparatus in response to the frame numbers of the received data frames, and transmitting, in response to the request frame number in the received feedback frame, a data frame having a frame number, which the reception side data communication apparatus has not confirmed, from the reception side communication apparatus to the transmission side data communication apparatus. A data frame reception confirmation information indicative of whether or not receptions of data frames from a frame number next to a minimum (or maximum) frame number in the data frames which have not been received to the last predetermined frame number have been confirmed is included in the feedback frame. Therefore, there can be obtained a data communication method which makes it possible to reduce an unnecessary re-transmission to a reception side data communication apparatus carried out even when data frames transmitted from a transmission side data communication apparatus to the reception side data communication apparatus have been correctly received by said reception side data communication apparatus, and to hence improve a throughput of transmission of a data frame from the transmission side data communication apparatus to the reception side data communication apparatus. In particular, in a transmission line having a large delay amount such as a satellite circuit or the like or when the data frame having the same frame number is not correctly received by a reception side data communication apparatus, a throughput of transmission of data frames from the transmission side data communication apparatus to the reception side data communication apparatus is remarkably improved.

According to a second aspect of the present invention, in a data communication method according to the first aspect of the present invention, a data frame having a frame number which the reception side data communication apparatus has not confirmed is transmitted from the transmission side data communication apparatus to the reception side data communication apparatus in response to both of the request frame number of the feedback frame and the data frame reception confirmation information. Therefore, there can be obtained a data communication method which makes it possible to reduce an unnecessary re-transmission to a reception side data communication apparatus carried out even when data frames transmitted from a transmission side data communication apparatus to the reception side data communication apparatus have been correctly received by said reception side data communication apparatus, and to hence improve a throughput of transmission of a data frame from the transmission side data communication apparatus to the reception side data communication apparatus. In particular, in a transmission line having a large delay amount such as a satellite circuit or the like or when the data frame having the same frame number is not correctly received by a reception side data communication apparatus, a throughput of transmission of data frames from the transmission side data communication apparatus to the reception side data communication apparatus is remarkably improved.

According to a third aspect of the present invention, a data communication method is one of transmitting data frames from a first predetermined frame number to a last predetermined frame number from a transmission side data communication apparatus to a reception side data communication apparatus in an ascending order (or a descending order), transmitting a feedback frame including at least a request frame number formed of a minimum (or maximum) frame number among those of data frames, which have not been received, from the reception side data communication apparatus to the transmission side data communication apparatus in response to the frame numbers of the received data frames, and transmitting, in response to the request frame number in the received feedback frame, a data frame having a frame number, which the reception side data communication apparatus has not confirmed, from the reception side communication apparatus to the transmission side data communication apparatus. If there is no data to be transmitted in a data area of the feedback frame, including in the data area of the feedback frame a data frame reception confirmation information indicative of whether or not receptions of data frames from a frame number next to a minimum (or maximum) frame number in the data frames which have not been received to the last predetermined frame number have been confirmed. Therefore, there can be obtained a data communication method which makes it possible to, without changing a format of the feedback frame and without lowering a maximum transmission rate of the feedback frame, reduce an unnecessary re-transmission to a reception side data communication apparatus carried out even when data frames transmitted from a transmission side data communication apparatus to the reception side data communication apparatus have been correctly received by said reception side data communication apparatus, and to hence improve a throughput of transmission of a data frame from the transmission side data communication apparatus to the reception side data communication apparatus. In particular, in a transmission line having a large delay amount such as a satellite circuit or the like or when the data frame having the same frame number is not correctly received by a reception side data communication apparatus, a throughput of transmission of data frames from the transmission side data communication apparatus to the reception side data communication apparatus is remarkably improved.

According to a fourth aspect of the present invention, in the data communication method according to the third aspect of the present invention, a data frame having a frame number which the reception side data communication apparatus has not confirmed is transmitted from the transmission side data communication apparatus to the reception side data communication apparatus in response to both of the request frame number of the feedback frame and the data frame reception confirmation information. Therefore, there can be obtained a data communication method which makes it possible to, without changing a format of the feedback frame and without lowering a maximum transmission rate of the feedback frame, reduce an unnecessary re-transmission to a reception side data communication apparatus carried out even when data frames transmitted from a transmission side data communication apparatus to the reception side data communication apparatus have been correctly received by said reception side data communication apparatus, and to hence improve a throughput of transmission of a data frame from the transmission side data communication apparatus to the reception side data communication apparatus. In particular, in a transmission line having a large delay amount such as a satellite circuit or the like or when the data frame having the same frame number is not correctly received by a reception side data communication apparatus, a throughput of transmission of data frames from the transmission side data communication apparatus to the reception side data communication apparatus is remarkably improved.

According to a fifth aspect of the present invention, a data communication method is one of transmitting data frames from a first predetermined frame number to a last predetermined frame number from a transmission side data communication apparatus to a reception side data communication apparatus in an ascending order (or a descending order), transmitting a feedback frame including at least a request frame number formed of a minimum (or maximum) frame number among those of data frames, which have not been received, from the reception side data communication apparatus to the transmission side data communication apparatus in response to the frame numbers of the received data frames, and transmitting, in response to the request frame number in the received feedback frame, a data frame having a frame number, which the reception side data communication apparatus has not confirmed, from the reception side communication apparatus to the transmission side data communication apparatus. Even if data to be transmitted is desired to be included in a data area of the feedback frame, temporarily stopping including the data to be transmitted in the data area and including in the data area of the feedback frame a data frame reception confirmation information indicative of whether or not receptions of data frames from a frame number next to a minimum (or maximum) frame number in the data frames which have not been received to the last predetermined frame number have been confirmed. Therefore, there can be obtained a data communication method which makes it possible to, without changing a format of the feedback frame or even if the communication is a full duplex communication in which data to be transmitted is included in a feedback frame, reduce an unnecessary re-transmission to a reception side data communication apparatus carried out even when data frames transmitted from a transmission side data communication apparatus to the reception side data communication apparatus have been correctly received by said reception side data communication apparatus, and to hence improve a throughput of transmission of a data frame from the transmission side data communication apparatus to the reception side data communication apparatus. In particular, in a transmission line having a large delay amount such as a satellite circuit or the like or when the data frame having the same frame number is not correctly received by a reception side data communication apparatus, a throughput of transmission of data frames from the transmission side data communication apparatus to the reception side data communication apparatus is remarkably improved.

According to a sixth aspect of the present invention, in a data communication method according to the fifth aspect of the present invention, a data frame having a frame number which the reception side data communication apparatus has not confirmed is transmitted from the transmission side data communication apparatus to the reception side data communication apparatus in response to both of the request frame number of the feedback frame and the data frame reception confirmation information. Therefore, there can be obtained a data communication method which makes it possible to, without changing a format of the feedback frame or even if the communication is a full duplex communication in which data to be transmitted is included in a feedback frame, reduce an unnecessary re-transmission to a reception side data communication apparatus carried out even when data frames transmitted from a transmission side data communication apparatus to the reception side data communication apparatus have been correctly received by said reception side data communication apparatus, and to hence improve a throughput of transmission of a data frame from the transmission side data communication apparatus to the reception side data communication apparatus. In particular, in a transmission line having a large delay amount such as a satellite circuit or the like or when the data frame having the same frame number is not correctly received by a reception side data communication apparatus, a throughput of transmission of data frames from the transmission side data communication apparatus to the reception side data communication apparatus is remarkably improved.

According to a seventh aspect of the present invention, a data communication apparatus is one employed in a data communication method of transmitting data frames from a first predetermined frame number to a last predetermined frame number from a transmission side data communication apparatus to a reception side data communication apparatus in an ascending order (or a descending order), transmitting a feedback frame including at least a request frame number formed of a minimum (or maximum) frame number among those of data frames, which have not been received, from the reception side data communication apparatus to the transmission side data communication apparatus in response to the frame numbers of the received data frames, and transmitting, in response to the request frame number in the received feedback frame, a data frame having a frame number, which the reception side data communication apparatus has not confirmed, from the reception side communication apparatus to the transmission side data communication apparatus. A data frame reception confirmation information indicative of whether or not receptions of data frames from a frame number next to a minimum (or maximum) frame number in the data frames which have not been received to the last predetermined frame number have been confirmed is included in the feedback frame. Therefore, there can be obtained a data communication apparatus which makes it possible to reduce an unnecessary re-transmission to a reception side data communication apparatus carried out even when data frames transmitted from a transmission side data communication apparatus to the reception side data communication apparatus have been correctly received by said reception side data communication apparatus, and to hence improve a throughput of transmission of a data frame from the transmission side data communication apparatus to the reception side data communication apparatus. In particular, in a transmission line having a large delay amount such as a satellite circuit or the like or when the data frame having the same frame number is not correctly received by a reception side data communication apparatus, a throughput of transmission of data frames from the transmission side data communication apparatus to the reception side data communication apparatus is remarkably improved.

According to an eighth aspect of the present invention, in a data communication apparatus according to the seventh aspect of the present invention, a data frame having a frame number which the reception side data communication apparatus has not confirmed is transmitted from the transmission side data communication apparatus to the reception side data communication apparatus in response to both of the request frame number of the feedback frame and the data frame reception confirmation information. Therefore, there can be obtained a data communication apparatus which makes it possible to reduce an unnecessary re-transmission to a reception side data communication apparatus carried out even when data frames transmitted from a transmission side data communication apparatus to the reception side data communication apparatus have been correctly received by said reception side data communication apparatus, and to hence improve a throughput of transmission of a data frame from the transmission side data communication apparatus to the reception side data communication apparatus. In particular, in a transmission line having a large delay amount such as a satellite circuit or the like or when the data frame having the same frame number is not correctly received by a reception side data communication apparatus, a throughput of transmission of data frames from the transmission side data communication apparatus to the reception side data communication apparatus is remarkably improved.

According to a ninth aspect of the present invention, a data communication apparatus is one employed in a data communication method of transmitting data frames from a first predetermined frame number to a last predetermined frame number from a transmission side data communication apparatus to a reception side data communication apparatus in an ascending order (or a descending order), transmitting a feedback frame including at least a request frame number formed of a minimum (or maximum) frame number among those of data frames, which have not been received, from the reception side data communication apparatus to the transmission side data communication apparatus in response to the frame numbers of the received data frames, and transmitting, in response to the request frame number in the received feedback frame, a data frame having a frame number, which the reception side data communication apparatus has not confirmed, from the reception side communication apparatus to the transmission side data communication apparatus. If there is no data to be transmitted in a data area of the feedback frame, including in the data area of the feedback frame a data frame reception confirmation information indicative of whether or not receptions of data frames from a frame number next to a minimum (or maximum) frame number in the data frames which have not been received to the last predetermined frame number have been confirmed. Therefore, there can be obtained a data communication apparatus which makes it possible to, without changing a format of the feedback frame and without lowering a maximum transmission rate of the feedback frame, reduce an unnecessary re-transmission to a reception side data communication apparatus carried out even when data frames transmitted from a transmission side data communication apparatus to the reception side data communication apparatus have been correctly received by said reception side data communication apparatus, and to hence improve a throughput of transmission of a data frame from the transmission side data communication apparatus to the reception side data communication apparatus. In particular, in a transmission line having a large delay amount such as a satellite circuit or the like or when the data frame having the same frame number is not correctly received by a reception side data communication apparatus, a throughput of transmission of data frames from the transmission side data communication apparatus to the reception side data communication apparatus is remarkably improved.

According to a tenth aspect of the present invention, in the data communication apparatus according to the ninth aspect of the present invention, a data frame having a frame number which the reception side data communication apparatus has not confirmed is transmitted from the transmission side data communication apparatus to the reception side data communication apparatus in response to both of the request frame number of the feedback frame and the data frame reception confirmation information. Therefore, there can be obtained a data communication apparatus which makes it possible to, without changing a format of the feedback frame and without lowering a maximum transmission rate of the feedback frame, reduce an unnecessary re-transmission to a reception side data communication apparatus carried out even when data frames transmitted from a transmission side data communication apparatus to the reception side data communication apparatus have been correctly received by said reception side data communication apparatus, and to hence improve a throughput of transmission of a data frame from the transmission side data communication apparatus to the reception side data communication apparatus. In particular, in a transmission line having a large delay amount such as a satellite circuit or the like or when the data frame having the same frame number is not correctly received by a reception side data communication apparatus, a throughput of transmission of data frames from the transmission side data communication apparatus to the reception side data communication apparatus is remarkably improved.

According to an eleventh aspect of the present invention, a data communication apparatus is one employed in a data communication method of transmitting data frames from a first predetermined frame number to a last predetermined frame number from a transmission side data communication apparatus to a reception side data communication apparatus in an ascending order (or a descending order), transmitting a feedback frame including at least a request frame number formed of a minimum (or maximum) frame number among those of data frames, which have not been received, from the reception side data communication apparatus to the transmission side data communication apparatus in response to the frame numbers of the received data frames, and transmitting, in response to the request frame number in the received feedback frame, a data frame having a frame number, which the reception side data communication apparatus has not confirmed, from the reception side communication apparatus to the transmission side data communication apparatus. Even if data to be transmitted is desired to be included in a data area of the feedback frame, temporarily stopping including the data to be transmitted in the data area and including in the data area of the feedback frame a data frame reception confirmation information indicative of whether or not receptions of data frames from a frame number next to a minimum (or maximum) frame number in the data frames which have not been received to the last predetermined frame number have been confirmed. Therefore, there can be obtained a data communication apparatus which makes it possible to, without changing a format of the feedback frame or even if the communication is a full duplex communication in which data to be transmitted is included in a feedback frame, reduce an unnecessary re-transmission to a reception side data communication apparatus carried out even when data frames transmitted from a transmission side data communication apparatus to the reception side data communication apparatus have been correctly received by said reception side data communication apparatus, and to hence improve a throughput of transmission of a data frame from the transmission side data communication apparatus to the reception side data communication apparatus. In particular, in a transmission line having a large delay amount such as a satellite circuit or the like or when the data frame having the same frame number is not correctly received by a reception side data communication apparatus, a throughput of transmission of data frames from the transmission side data communication apparatus to the reception side data communication apparatus is remarkably improved.

According to a twelfth aspect of the present invention, in a data communication apparatus according to the eleventh aspect of the present invention, a data frame having a frame number which the reception side data communication apparatus has not confirmed is transmitted from the transmission side data communication apparatus to the reception side data communication apparatus in response to both of the request frame number of the feedback frame and the data frame reception confirmation information. Therefore, there can be obtained a data communication apparatus which makes it possible to, without changing a format of the feedback frame or even if the communication is a full duplex communication in which data to be transmitted is included in a feedback frame, reduce an unnecessary re-transmission to a reception side data communication apparatus carried out even when data frames transmitted from a transmission side data communication apparatus to the reception side data communication apparatus have been correctly received by said reception side data communication apparatus, and to hence improve a throughput of transmission of a data frame from the transmission side data communication apparatus to the reception side data communication apparatus. In particular, in a transmission line having a large delay amount such as a satellite circuit or the like or when the data frame having the same frame number is not correctly received by a reception side data communication apparatus, a throughput of transmission of data frames from the transmission side data communication apparatus to the reception side data communication apparatus is remarkably improved.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A data communication method of transmitting data frames from a first predetermined frame number to a last predetermined frame number from a transmission side data communication apparatus to a reception side data communication apparatus in one of an ascending order and a descending order, transmitting a feedback frame including at least a request frame number from one of a minimum and a maximum frame number among those of data frames that have not been received from said reception side data communication apparatus to said transmission side data communication apparatus in response to received data frames, and transmitting, in response to said request frame number in said received feedback frame, a data frame that said reception side data communication apparatus has not confirmed from said transmission side data communication apparatus to said reception side data communication apparatus, comprising the step of:

including in said feedback frame data frame reception confirmation information indicative of whether receptions of data frames from a frame number next to said one of a minimum and a maximum frame number in said data frames that have not been received to said last predetermined frame number have been confirmed.

2. A data communication method according to claim 1, wherein said data frame that said reception side data communication apparatus has not confirmed is transmitted from said transmission side data communication apparatus to said reception side data communication apparatus in response to both said request frame number of said feedback frame and said data frame reception confirmation information.

3. A data communication method according to claim 1, further comprising the step of forming said data frame and said feedback frame to have the same format.

4. A data communication method of transmitting data frames from a first predetermined frame number to a last predetermined frame number from a transmission side data communication apparatus to a reception side data communication apparatus in one of an ascending order and a descending order, transmitting a feedback frame including at least a request frame number from one of a minimum and a maximum frame number among those of data frames that have not been received from said reception side data communication apparatus to said transmission side data communication apparatus in response to received data frames, and transmitting, in response to said request frame number in said received feedback frame, a data frame that said reception side data communication apparatus has not confirmed from said transmission side data communication apparatus to said reception side data communication apparatus, comprising the step of:

if there is no data to be transmitted in a data area of said feedback frame, including in said data area of said feedback frame data frame reception confirmation information indicative of whether receptions of data frames from a frame number next to said one of a minimum and a maximum frame number in said data frames that have not been received to said last predetermined frame number have been confirmed.

5. A data communication method according to claim 4, wherein said data frame that said reception side data communication apparatus has not confirmed is transmitted from said transmission side data communication apparatus to said reception side data communication apparatus in response to both said request frame number of said feedback frame and said data frame reception confirmation information.

6. A data communication method of transmitting data frames from a first predetermined frame number to a last predetermined frame number from a transmission side data communication apparatus to a reception side data communication apparatus in one of an ascending order, transmitting a feedback frame including at least a request frame number from one of a minimum and a maximum frame number among those of data frames that have not been received from said reception side data communication apparatus to said transmission side data communication apparatus in response to received data frames, and transmitting, in response to said request frame number in said received feedback frames, a data frame that said reception side data communication apparatus has not confirmed from said transmission side data communication apparatus to said reception side data communication apparatus, comprising the step of:

even if data to be transmitted is desired to be included in a data area of said feedback frame, temporarily not including said data to be transmitted in said data area and including in a dedicated area of said feedback frame other than said data area a reception confirmation table indicating whether receptions of data frames from a frame number next to said one of a minimum and a maximum frame number of said data frames that have not been received to said last predetermined frame number have been confirmed.

7. A data communication method according to claim 6, wherein said data frame that said reception side data communication apparatus has not confirmed is transmitted from said transmission side data communication apparatus to said reception side data communication apparatus in response to both said request frame number of said feedback frame and said reception confirmation table.

8. A data communication method according to claim 6, further comprising the step of forming said data frame and said feedback frame to have the same format.

9. A data communication method according to claim 6, further comprising the step of operating said transmission side data communication apparatus and said reception side data communication apparatus as a full duplex communication system.

10. A data communication method according to claim 6, further comprising the step of detecting that the data frame having a predetermined number has not been received at said reception side data communication apparatus and, upon detecting a reception failure for a predetermined number of times, transmitting said feedback frame.

11. A data communication apparatus employed in a data communication method of transmitting data frames from a first predetermined frame number to a last predetermined frame number from a transmission side data communication apparatus to a reception side data communication apparatus in one of an ascending order and a descending order, transmitting a feedback frame including at least a request frame number from one of a minimum and a maximum frame number among those of data frames that have not been received from said reception side data communication apparatus to said transmission side data communication apparatus in response to received data frames, and transmitting, in response to said request frame number in said received feedback frame, a data frame that said reception side data communication apparatus has not confirmed from said transmission side data communication apparatus to said reception side data communication apparatus, comprising:

means for adding in said feedback frame data frame reception confirmation information indicative of whether receptions of data frames from a frame number next to said one of a minimum and a maximum frame number in said data frames that have not been received to said last predetermined frames number have been confirmed.

12. A data communication apparatus according to claim 11, wherein said data frame that said reception side data communication apparatus has not confirmed is transmitted from said transmission side data communication apparatus to said reception side data communication apparatus in response to both said request frame number of said feedback frame and said data frame reception confirmation information.

13. A data communication apparatus according to claim 11, wherein said data frame and said feedback frame have the same format.

14. A data communication apparatus employed in a data communication method of transmitting data frames from a first predetermined frame number to a last predetermined frame number from a transmission side data communication apparatus to a reception side data communication apparatus in one of an ascending order and a descending order, transmitting a feedback frame including at least a request frame number from one of a minimum and a maximum frame number among those of data frames that have not been received from said reception side data communication apparatus in response to received data frames, and transmitting, in response to said request frame number in said received feedback frame, a data frame that said reception side data communication apparatus has not confirmed from said transmission side data communication apparatus to said reception side data communication apparatus, comprising:

means for, if there is no data to be transmitted in a data area of said feedback frame, adding in said data area of said feedback frame data frame reception confirmation information indicative of whether receptions of data frames from a frame number next to said one of a minimum and a maximum frame number in said data frames that have not been received to said last predetermined frame number have been confirmed.

15. A data communication apparatus according to claim 14, wherein said data frame that said reception side data communication apparatus has not confirmed is transmitted from said transmission side data communication apparatus to said reception side data communication apparatus in response to both said request frame number of said feedback frame and said frame reception confirmation information.

16. A data communication apparatus according to claim 14, wherein said data frame and said feedback frame have the same format.

17. A data communication apparatus employed in a data communication method of transmitting data frames from a first predetermined frame number to a last predetermined frame number from a transmission side data communication apparatus to a reception side data communication apparatus in one of an ascending order and a descending order, transmitting a feedback frame including at least a request frame number from one of a minimum and a maximum frame number among those of data frames that have not been received from said reception side data communication apparatus to said transmission side data communication apparatus in response to received data frames, and transmitting, in response to said request frame number in said received feedback frame, a data frame that said reception side data communication apparatus has not confirmed from said transmission side data communication apparatus to said reception side data communication apparatus, comprising:

means for, even if data to be transmitted is desired to be included in a data area of said feedback frame, temporarily not including said data to be transmitted in said data area and including in a dedicated area of said feedback frame other than said area a reception confirmation table indicating whether receptions of data frames from a frame number next to said one of a minimum and a maximum frame number in said data frames that have not been received to said last predetermined frame number have been confirmed.

18. A data communication method according to claim 17, wherein said data frame that said reception side data communication apparatus has not confirmed is transmitted from said transmission side data communication apparatus to said reception side data communication apparatus in response to both said request frame number of said feedback frame and said reception confirmation table.

19. A data communication apparatus according to claim 17, wherein said data frame and said feedback frame have the same format.

20. A transmission method for transmitting data frames from a first predetermined frame number to a last predetermined frame number from a transmission side data communication apparatus to a reception side data communication apparatus, comprising the steps of:

transmitting said data frames in one of an ascending order and a descending order until receiving at least one feedback frame from said reception side data communication apparatus, said at least one feedback frame including:

a request frame number selected from one of a minimum and a maximum frame number among those data frames that have not been received by said reception side data communication apparatus, and a data frame reception confirmation table indicating whether receptions of data frames from a frame number next to said one of a minimum and a maximum frame number in said data frames that have not been received to said last predetermined frame number have been confirmed; and transmitting, in response to each feedback frame, a data frame that said reception side data communication apparatus has not confirmed.

21. A transmission method according to claim 20, further comprising the step of forming said data frames and said feedback frame to have the same format.

22. A transmission side data communication apparatus for transmitting data frames from a first predetermined frame number to a last predetermined frame number from said transmission side data communication apparatus to a reception side data communication apparatus, comprising:

means for transmitting said data frames in one of an ascending order and a descending order until receiving at least one feedback frame from said reception side data communication apparatus, said at least one feedback frame including:

a request frame number selected from one of a minimum and a maximum frame number among those data frames that have not been received by said reception side data communication apparatus, and a data frame reception confirmation table indicating whether receptions of data frames from a frame number next to said one of a minimum and a maximum frame number in said data frames that have not been received to said last predetermined frame number have been confirmed; and means for transmitting, in response to each feedback frame, a data frame that said reception side data communication apparatus has not confirmed.

23. A transmission side data communication apparatus according to claim 22, wherein said data frames and said feedback frame have the same format.

24. A reception method for receiving data frames from a first predetermined frame number to a last predetermined frame number from a transmission side data communication apparatus, comprising the steps of:

receiving said data frames; and transmitting a feedback frame to said transmission side data communication apparatus in response to each data frame received, each feedback frame including:

a request frame number selected from one of a minimum and a maximum frame number among those data frames that have not been received by said reception side data communication apparatus, and a data frame reception confirmation table indicating whether receptions of data frames from a frame number next to said one of a minimum and a maximum frame number in said data frames that have not been received to said last predetermined frame number have been confirmed.

25. A reception method according to claim 24, further comprising the step of forming said data frames and said feedback frame to have the same format.

26. A reception side data communication apparatus for receiving data frames from a first predetermined frame number to a last predetermined frame number from a transmission side data communication apparatus, comprising:

means for receiving said data frames; and means for transmitting a feedback frame to said transmission side data communication apparatus in response to each data frame received, each feedback frame including:

a request frame number selected from one of a minimum and a maximum frame number among those data frames that have not been received by said reception side data communication apparatus, and a data frame reception confirmation table indicating whether receptions of data frames from a frame number next to said one of a minimum and a maximum frame number in said data frames that have not been received to said last predetermined frame number have been confirmed.

27. a reception side data communication apparatus according to claim 26, wherein said data frames and said feedback frame have the same format.

* * * * *